US008781872B2

(12) United States Patent
Rai

(10) Patent No.: US 8,781,872 B2
(45) Date of Patent: *Jul. 15, 2014

(54) METHODS AND SYSTEMS FOR ASSIGNING OPERATORS TO PRINT PRODUCTION CELLS BASED ON RELATIONSHIPS

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 850 days.

This patent is subject to a terminal disclaimer.

(21) Appl. No.: 12/556,203

(22) Filed: Sep. 9, 2009

(65) Prior Publication Data

US 2011/0058212 A1 Mar. 10, 2011

(51) Int. Cl.
*G06Q 10/00* (2012.01)
*G06Q 30/00* (2012.01)

(52) U.S. Cl.
USPC .................................................. 705/7.14

(58) Field of Classification Search
USPC .................................................. 705/7.14
See application file for complete search history.

(56) References Cited

U.S. PATENT DOCUMENTS

| | | | |
|---|---|---|---|
| 7,079,266 B1 * | 7/2006 | Rai et al. ...................... | 358/1.13 |
| 2003/0083891 A1 * | 5/2003 | Lang et al. .................... | 705/1 |
| 2007/0190504 A1 * | 8/2007 | Schwartz et al. ............. | 434/219 |
| 2007/0206511 A1 * | 9/2007 | Purpura ........................ | 370/252 |
| 2008/0027783 A1 * | 1/2008 | Hughes et al. ................ | 705/9 |
| 2008/0059291 A1 * | 3/2008 | McCall ........................ | 705/11 |
| 2008/0120261 A1 * | 5/2008 | John et al. .................... | 706/45 |
| 2009/0006173 A1 * | 1/2009 | Farrell et al. ................. | 705/9 |
| 2009/0030927 A1 * | 1/2009 | Cases et al. .................. | 707/102 |

OTHER PUBLICATIONS

Carolyn J. Anderson and Stanley Wasserman, Katherine Faust. Building Stochastic Blockmodels. Social Networks 14 (1992) North-Holland pp. 137-161.*
Eric Wang, Huey-Wen Chou, and James Jiang. The impacts of Charismatic Leadership Style on Team Cohesiveness and Overall Performance during ERP Implementation. International Journal of Project Management 23 (2005) 173-180.*
Frank, Kenneth A. Identifying Cohesive Subgroups. Michigan State Universitym, based on paper of the same title presented at the Sunbelt Conference, New Orleans, 1994.*

* cited by examiner

*Primary Examiner* — Stephanie Delich
(74) *Attorney, Agent, or Firm* — Fox Rothschild LLP

(57) ABSTRACT

A system of assigning operators to cells in a document production environment may include a computing device and a computer-readable storage medium in communication with the computing device. The computer-readable storage medium may include one or more programming instructions for identifying a first plurality of cell operators, where each cell operator may be associated with one or more skills, identifying a cell to be staffed, where the cell may be associated with one or more functions, identifying, from the first plurality of cell operators, a subset of cell operators including one or more cell operators who each possess the skills necessary to perform the one or more functions associated with the cell, selecting, from the subset, a second plurality of cell operators based on at least one relationship amongst the second plurality of cell operators, and assigning the second plurality of cell operators to the cell.

18 Claims, 3 Drawing Sheets

METHODS AND SYSTEMS FOR ASSIGNING OPERATORS TO PRINT PRODUCTION CELLS BASED ON RELATIONSHIPS

CROSS REFERENCE TO RELATED APPLICATIONS

This application is related to U.S. patent application Ser. No. 12/556,097, filed Sep. 9, 2009.

BACKGROUND

Methods of assigning an operator to a print production environment based on his or her skills are known in the art. For example, operators who possess necessary skills could arbitrarily be assigned to work together. However, teamwork plays an important role in the success of any group initiative, including the efficient operation of a print production environment. Operators who have established personal, professional or social relationships with other operators could improve work efficiency and effectiveness.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In an embodiment, a system of assigning operators to cells in a document production environment may include a computing device and a computer-readable storage medium in communication with the computing device. The computer-readable storage medium may include one or more programming instructions for identifying a first plurality of cell operators, where each cell operator may be associated with one or more skills, identifying a cell to be staffed, where the cell may be associated with one or more functions, identifying, from the first plurality of cell operators, a subset of cell operators including one or more cell operators who each possess the skills necessary to perform the one or more functions associated with the cell, selecting, from the subset, a second plurality of cell operators based on at least one relationship amongst the second plurality of cell operators, and assigning the second plurality of cell operators to the cell.

In an embodiment, a method of assigning operators to cells in a document production environment may include identifying a first plurality of cell operators, where each cell operator may be associated with one or more skills, identifying a cell to be staffed, where the cell may be associated with one or more functions, identifying, by a computing device, from the first plurality of cell operators, a subset of cell operators comprising one or more cell operators who each possess the skills necessary to perform the one or more functions associated with the cell, selecting, by the computing device, from the subset, a second plurality of cell operators based on at least one relationship amongst the second plurality of cell operators, and assigning the second plurality of cell operators to the cell.

BRIEF DESCRIPTION OF THE DRAWINGS

Aspects, features, benefits and advantages of the present invention will be apparent with regard to the following description and accompanying drawings, of which.

DETAILED DESCRIPTION

For purposes of the discussion below, a "document production environment" refers to an entity that includes a plurality of document production devices, such as printers, cutters, collators and the like. A document production environment may be a freestanding entity, including one or more print-related devices, or it may be part of a corporation or other entity. Additionally, a document production environment may communicate with one or more servers by way of a local area network or a wide area network, such as the Internet, the World Wide Web or the like.

A "print job" refers to a job processed in a document production environment. For example, a print job may include producing credit card statements corresponding to a certain credit card company, producing bank statements corresponding to a certain bank, printing a document or the like.

A "cell" is a grouping of one or more machines, devices, document production devices and/or the like used to process at least a portion of a print job. A document production environment may include one or more cells.

A "cell operator" refers to a person who operates one or more document production devices to process at least a portion of a print job.

Figure 1:
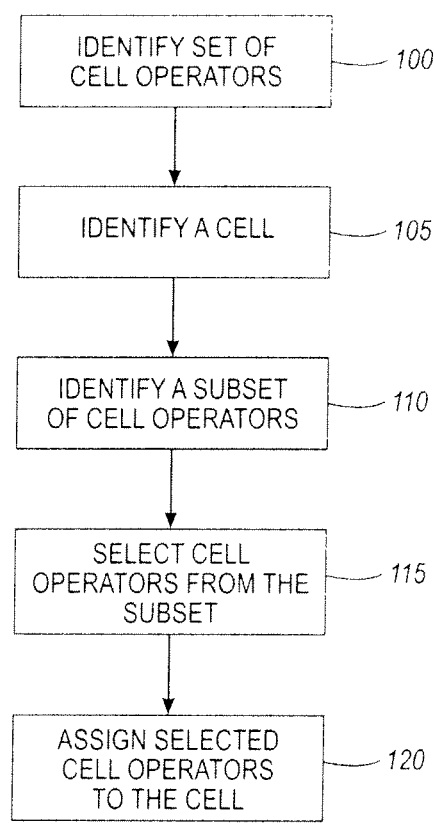
FIG. 1 illustrates an exemplary method of assigning operators to a cell according to an embodiment.

FIG. 1 illustrates an exemplary method of assigning operators to a cell according to an embodiment. As illustrated by FIG. 1, a set of cell operators may be identified 100. In an embodiment, the set may include all of the cell operators who work in a document production environment. In an alternate embodiment, the set may include a subgroup of the cell operators who work in a document production environment.

In an embodiment, each cell operator may possess one or more skills. The skills may include those that are helpful and/or necessary to operate one or more document production devices in a cell. In an embodiment, a skill may be associated with one or more functions that a cell operator may perform. For example, in a print production environment, exemplary skills may include printing, cutting, binding, shrink wrapping, punching, inserting, collating and the like. Table 1 illustrates an exemplary skill matrix identifying cell operators and the skills that they possess. For example, as illustrated by Table 1, John is proficient in printing, cutting, binding and shrink-wrapping, whereas Mary is proficient in printing, binding and shrink-wrapping.

TABLE 1

|      | Print | Cut | Bind | Punch | Insert | Shrink-Wrap |
|------|-------|-----|------|-------|--------|-------------|
| John | 1     | 1   | 1    | 0     | 0      | 1           |
| Jack | 1     | 1   | 1    | 0     | 1      | 1           |

TABLE 1-continued

|  | Print | Cut | Bind | Punch | Insert | Shrink-Wrap |
| --- | --- | --- | --- | --- | --- | --- |
| Bill | 1 | 1 | 0 | 1 | 0 | 1 |
| Tim | 1 | 1 | 1 | 1 | 1 | 1 |
| Mary | 1 | 0 | 1 | 0 | 0 | 1 |

In an embodiment, a cell operator may be associated with an availability status. An availability status may indicate when a cell operator is available to work. An availability status may include a schedule associated with a cell operator. For example, an availability status may include the times and days the cell operator is available to work, an indication of whether the operator is already assigned to another cell and/or the like.

Referring back to FIG. 1, a cell may be identified 105. An identified cell may be one that requires staffing of one or more cell operators. In an embodiment, a subset of cell operators may be identified 110. The subset may be identified from the initial set of cell operators. In an embodiment, the subset may include one or more cell operators who possess one or more skills that correspond to one or more functions associated with the cell. In an embodiment, a cell may be associated with one or more functions. For example, one or more print production devices in the cell may perform one or more print related functions such as printing, binding, cutting, punching, inserting, shrink-wrapping and/or the like. In an embodiment, the operators in the subset may collectively possess the skills necessary to operate the cell.

For example, if a cell is associated with the functions {print, cut}, the subset of the cell operators identified in Table 1 may include {John, Jack, Bill, Tim, Mary} because each of these operators has skills in printing and/or cutting.

In an embodiment, the subset may include one or more cell operators who each possess every skill required to staff the cell. For example, referring to the cell described above that is associated with the functions {print, cut}, in this embodiment, the subset of the cell operators identified in Table 1 may include {John, Jack, Bill, Tim} because each of these operators possesses skills in printing and cutting. Mary may be excluded from this subset because she does not possess skills in cutting.

In an embodiment, one or more cell operators may be selected 115 from the subset. The number of selected cell operators may be equal to the number of cell operators needed to staff the cell. Alternatively, the number of selected cell operators may be greater or less than the number of cell operators needed to staff the cell. In an embodiment, the number of cell operators needed to staff a cell may be determined by a user, a print production environment manager and/or the like.

In an embodiment, cell operators may be selected 115 based on a relationship amongst or between the cell operators. In an embodiment, a relationship may be a social relationship, a personal relationship, a professional relationship and/or the like. In an embodiment, relationship information between a cell operator and one or more other cell operators may be gathered. Relationship information may include an indication of whether a relationship exists between two or more cell operators, a strength associated with the relationship and/or the like. In an embodiment, relationship information may be provided by a cell operator, a print production environment manager and/or the like.

In an embodiment, a new employee may have no established relationship with the other cell operators. A cell operator, print production environment manager and/or the like may estimate relationship information for a new employee. Alternatively, a new employee may be identified as having a relationship with every other cell operator. In an alternate embodiment, a new employee may be identified as having no relationship with the other cell operators.

In an embodiment, relationship information may be represented as a matrix, a chart, a graph and/or the like. For example, Table 2 illustrates an exemplary matrix of relationships between the cell operators identified in Table 1. As illustrated in Table 2, a '1' indicates that a relationship exists between two cell operators, while a '0' indicates that no relationship exists between the cell operators. For example, referring to Table 2, a relationship exists between John and Jack, but no relationship exists between John and Bill.

TABLE 2

|  | John | Jack | Bill | Tim | Mary |
| --- | --- | --- | --- | --- | --- |
| John | 1 | 1 | 0 | 0 | 1 |
| Jack | 1 | 1 | 1 | 0 | 1 |
| Bill | 0 | 1 | 1 | 1 | 0 |
| Tim | 0 | 0 | 1 | 1 | 1 |
| Mary | 1 | 1 | 0 | 1 | 1 |

In an embodiment, a relationship matrix, such as that illustrated in Table 2, may be asymmetric. For example, a first cell operator may consider himself connected to a second cell operator, however the second cell operator may not consider himself connected to the first cell operator.

Figure 2:
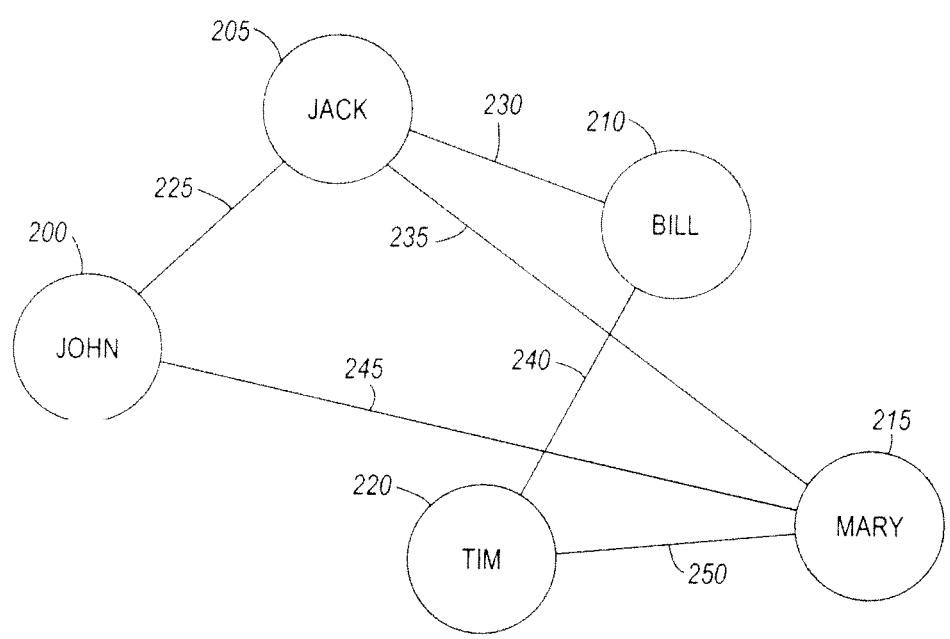
FIG. 2 illustrates a graphical representation of exemplary relationship information according to an embodiment.

FIG. 2 illustrates a graphical representation of the relationship information illustrated in Table 2. As illustrated in FIG. 2, each node 200, 205, 210, 215, 220 represents a cell operator, and each line 225, 230, 235, 240, 245, 250 connecting two nodes represents a relationship that exists between the cell operators associated with the corresponding nodes. For example, a relationship exists between Bill and Tim because a line 240 connects their corresponding nodes 210, 220. However, no relationship exists between John and Tim because there is no line connecting their corresponding nodes 200, 220.

In an embodiment, a set of cell operators may be selected 115 based on the strength of a relationship amongst or between the cell operators in the set. In an embodiment, a strength of a relationship may be identified as a value on a scale. For example, the strength of a relationship may be measured on a scale from 0 to 5, with 0 representing no relationship, and 5 representing a very strong relationship. As another example, the strength of a relationship may be measured on a scale of high, medium or low. Additional and/or alternate relationship measurements may be used within the scope of this disclosure.

In an embodiment, the combination of cell operators having the required skills and the strongest relationship may be selected 115 to staff a cell. For example, the relationships of different combinations of cell operators in a subset may be examined. In an embodiment, the combination having the strongest relationship may be selected 115.

For example, referring to Table 1, if a cell is associated with the functions {print, cut, bind} then John, Jack and Tim are possible cell operators because each possesses skills in printing, cutting and binding. If the cell only requires two operators, then the possible combinations are {John, Jack}, {John, Tim} and {Jack, Tim}.

Table 3 illustrates relationships between the combinations identified above. As illustrated by Table 3, a relationship exists for the combinations of {John, Jack}. As such, the group of John and Jack may be selected 115 to staff a cell.

TABLE 3

| Operator Combination | Relationship? |
|---|---|
| {John, Jack} | Yes |
| {John, Tim} | No |
| {Jack, Tim} | No |

In an embodiment, a group having more than two operators may be selected 115 to staff a cell. In an embodiment, a cell may be associated with a range of the number of cell operators needed to staff a cell. A cell may be associated with a minimum number of cell operators and a maximum number of cell operators. For example, a range associated with a cell may be 2-5, meaning that between two and five cell operators, inclusive, may staff the cell.

In an embodiment, a group may be selected 115 based on its cohesiveness. For example, the group of operators having the strongest cohesiveness value may be selected to staff a cell. In an embodiment, each distinct combination of cell operators equal to each number of cell operators in the range associated with a cell may have a cohesiveness value. For example, the number of cell operators needed to staff a cell may be between 2 and 4. A cohesiveness value associated with one or more distinct groups of two, three and four operators may be determined, and the group having the strongest, or highest, cohesiveness value may be selected 115.

In an embodiment, a cohesiveness value associated with a group may be represented by:

$$\frac{T}{(n(n-1))},$$

T is the total number of connections between the operators in the group; and n is the total number of operators in the group.

For example, if three or four operators are required to staff a cell that requires printing, cutting and shrink wrapping, then possible combinations from Table 1 may include {John, Jack, Bill}, {John, Jack, Tim}, {Jack, Bill, Tim} and {John, Jack, Bill, Tim}.

In an embodiment, for the first combination of {John, Jack, Bill}, the total number of connections between John, Jack and Bill is '4' as illustrated by Table 4.

TABLE 4

| Operator 1 | Operator 2 | Connection |
|---|---|---|
| John | Jack | Y |
| John | Bill | N |
| Jack | John | Y |
| Jack | Bill | Y |
| Bill | John | N |
| Bill | Jack | Y |
| | | Total = 4 |

In an embodiment, the cohesiveness value of the first combination may be represented by:

$$\frac{T}{(n(n-1))} = \frac{4}{(3(3-1))} = \frac{4}{6} \sim 0.6667$$

In an embodiment, the cohesiveness values for the other combinations may be similarly determined. Table 5 illustrates the cohesiveness values for each combination according to an embodiment.

TABLE 5

| Group | Total Number of Relationships | Number of Operators in Group | Cohesiveness Value |
|---|---|---|---|
| {John, Jack, Bill} | 4 | 3 | 0.6667 |
| {John, Jack, Tim} | 2 | 3 | 0.3333 |
| {Jack, Bill, Tim} | 4 | 3 | 0.6667 |
| {John, Jack, Bill, Tim} | 6 | 4 | 0.5000 |

In an embodiment, a combination may be selected 115 based on its cohesiveness value. For example, the combination having the strongest cohesion value may be selected 115. As illustrated by Table 5, the combinations of {John, Jack, Bill} and {Jack, Bill, Tim} have the highest cohesiveness value and may be selected 115 to staff the cell.

In an embodiment, if more than one group has the strongest cohesiveness value, such as in the example above, then one group may be selected to staff the cell. For example, in an embodiment, a group may be selected at random to staff the cell. Alternatively, in an embodiment, a group may be selected by a print production environment manager.

In an embodiment, the selected combination of cell operators may be assigned 120 to the cell. In an embodiment, information associated with the selected combination may be displayed to a user. For example, one or more of the cell operators, their corresponding skills, the cell, the associated cell functions and/or the like may be displayed for the selected combination.

Figure 3:
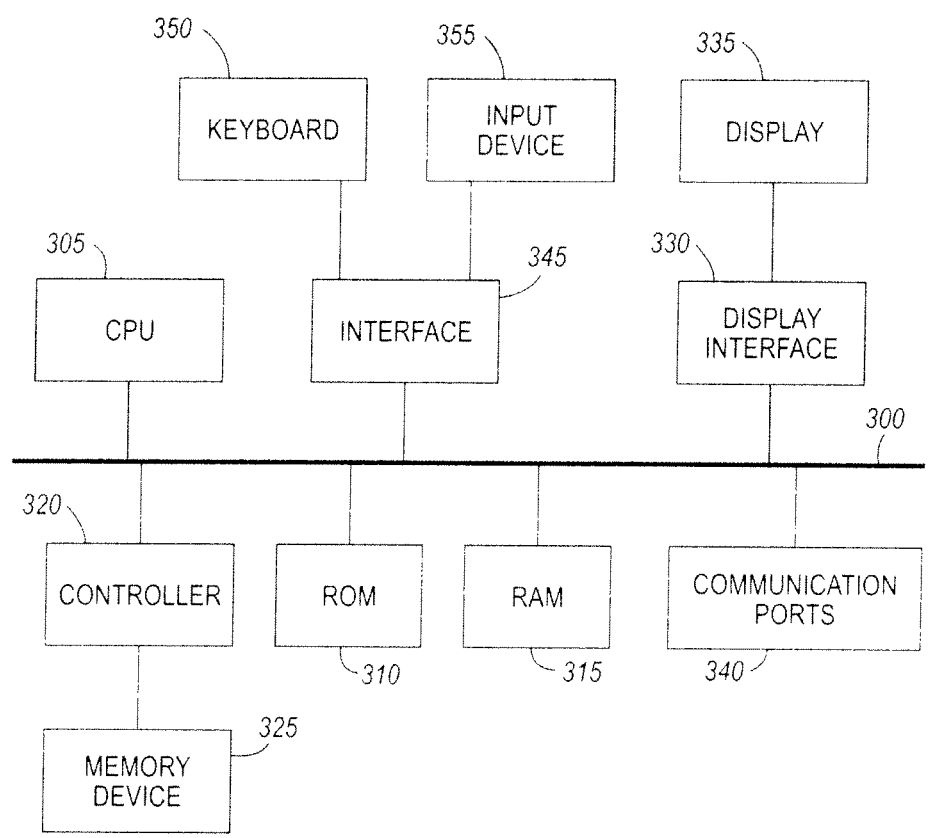
FIG. 3 illustrates a block diagram of exemplary internal hardware according to an embodiment.

FIG. 3 depicts a block diagram of exemplary internal hardware that may be used to contain or implement program instructions according to an embodiment. A bus 300 serves as the main information highway interconnecting the other illustrated components of the hardware. CPU 305 is the central processing unit of the system, performing calculations and logic operations required to execute a program. Read only memory (ROM) 310 and random access memory (RAM) 315 constitute exemplary memory devices.

A controller 320 interfaces with one or more optional memory devices 325 to the system bus 300. These memory devices 325 may include, for example, an external or internal DVD drive, a CD ROM drive, a hard drive, flash memory, a USB drive or the like. As indicated previously, these various drives and controllers are optional devices.

Program instructions may be stored in the ROM 310 and/or the RAM 315. Optionally, program instructions may be stored on a tangible computer readable medium such as a compact disk, a digital disk, flash memory, a memory card, a USB drive, an optical disc storage medium, such as BLU-RAY™ disc, and/or other recording medium.

An optional display interface 330 may permit information from the bus 300 to be displayed on the display 335 in audio, visual, graphic or alphanumeric format. Communication with external devices may occur using various communication ports 340. An exemplary communication port 340 may be attached to a communications network, such as the Internet or an intranet.

The hardware may also include an interface 345 which allows for receipt of data from input devices such as a keyboard 350 or other input device 355 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system of assigning operators to cells in a document production environment, the system comprising:
    a computing device; and
    a computer-readable storage medium in communication with the computing device, wherein the computer-readable storage medium comprises one or more programming instructions for:
        identifying a cell in the document production environment to be staffed, wherein the cell comprises one or more document production devices,
        identifying one or more print-related functions associated with the identified cell that are performable by at least one of the document production devices of the identified cell,
        identifying a first plurality of cell operators who each possesses skills necessary to perform each identified print-related function associated with the identified cell,
        selecting, from the first plurality, a second plurality of cell operators based on at least one relationship amongst the second plurality of cell operators by:
            determining a number of cell operators needed to staff the cell,
            for each distinct combination of cell operators in the first plurality having a number of cell operators equal to the number of cell operators needed to staff the cell, determining a cohesiveness value associated with the combination by:
                determining a total number of relationships that exist among the cell operators in the combination,
                identifying a total number of cell operators in the combination,
                determining a product of the total number of cell operators and one less than the total number of cell operators, and
                determining a ratio of the total number of relationships to the product, and
            selecting the combination having a highest cohesiveness value, and
            assigning the second plurality of cell operators from the selected combination to the identified cell.

2. The system of claim 1, wherein the one or more programming instructions for identifying a first plurality of cell operators comprise one or more programming instructions for identifying a plurality of cell operators based on an availability status for each cell operator.

3. The system of claim 1, wherein the one or more programming instructions for selecting a second plurality of cell operators comprise one or more programming instructions for selecting a second plurality of cell operators, wherein one or more of the following relationships exist among or between the cell operators in the second plurality:
    a social relationship;
    a personal relationship; and
    a professional relationship.

4. The system of claim 1, further comprising a user interface having a display, wherein the display is configured to display the assigned second plurality of cell operators to a user.

5. The system of claim 1, wherein a relationship that exists among the cell operators has an associated relationship strength.

6. A method of assigning operators to cells in a document production environment, the method comprising:
    identifying a cell in the document production environment to be staffed, wherein the cell comprises one or more document production devices;
    identifying one or more print-related functions associated with the identified cell that are performable by at least one of the document production devices of the identified cell;
    identifying, by a computing device, a first plurality of cell operators who each possesses skills necessary to perform each identified print-related function associated with the identified cell;
    selecting, by the computing device, from the first plurality, a second plurality of cell operators based on at least one relationship amongst the second plurality of cell operators by:
        determining a number of cell operators needed to staff the cell,
        for each distinct combination of cell operators in the first plurality having a number of cell operators equal to the number of cell operators needed to staff the cell, determining a cohesiveness value associated with the combination by:
            determining a total number of relationships that exist among the cell operators in the combination,
            identifying a total number of cell operators in the combination,
            determining a product of the total number of cell operators and one less than the total number of cell operators, and
            determining a ratio of the total number of relationships to the product, and
        selecting the combination having a highest cohesiveness value; and
            assigning the second plurality of cell operators from the selected combination to the identified cell.

7. The method of claim 6, wherein identifying a first plurality of cell operators comprises identifying a plurality of cell operators based on an availability status for each cell operator.

8. The method of claim 6, wherein one or more of the following relationships exist among or between the cell operators in the second plurality:
    a social relationship;
    a personal relationship; and
    a professional relationship.

9. The method of claim 6, wherein a relationship that exists among the cell operators has an associated relationship strength.

10. A system of assigning operators to cells in a document production environment, the system comprising:
    a computing device; and
    a computer-readable storage medium in communication with the computing device, wherein the computer-readable storage medium comprises one or more programming instructions for:
        identifying a cell in the document production environment to be staffed, wherein the cell comprises one or more document production devices,
        identifying one or more print-related functions associated with the identified cell that are performable by at least one of the document production devices of the identified cell, identifying a first plurality of cell operators who each possesses skills necessary to perform each identified print-related function associated with the identified cell, selecting, from the first plurality, a second plurality of cell operators based on at least one relationship amongst the second plurality of cell operators by:

identifying a range of a number of cell operators needed to staff the cell, wherein the range is defined by a minimum number of cell operators needed to staff the cell and a maximum number of cell operators needed to staff the cell, for each number of cell operators in the range, determining a cohesiveness value associated with each distinct combination of cell operators in the subset equal to the number of cell operators, wherein determining the cohesiveness value comprises:

determining a total number of relationships that exist among the cell operators in the combination, identifying a total number of cell operators in the combination, determining a product of the total number of cell operators and one less than the total number of cell operators, and determining a ratio of the total number of relationships to the product, and selecting the combination having a highest cohesiveness value, and assigning the second plurality of cell operators from the selected combination to the identified cell.

11. The system of claim 10, wherein the one or more programming instructions for identifying a first plurality of cell operators comprise one or more programming instructions for identifying a plurality of cell operators based on an availability status for each cell operator.

12. The system of claim 10, wherein the one or more programming instructions for selecting a second plurality of cell operators comprise one or more programming instructions for selecting a second plurality of cell operators, wherein one or more of the following relationships exist among or between the cell operators in the second plurality:
a social relationship;
a personal relationship; and
a professional relationship.

13. The system of claim 10, further comprising a user interface having a display, wherein the display is configured to display the assigned second plurality of cell operators to a user.

14. The system of claim 10, wherein a relationship that exists among the cell operators has an associated relationship strength.

15. A method of assigning operators to cells in a document production environment, the method comprising:

identifying a cell in the document production environment to be staffed, wherein the cell comprises one or more document production devices;

identifying one or more print-related functions associated with the identified cell that are performable by at least one of the document production devices of the identified cell;

identifying a first plurality of cell operators who each possesses skills necessary to perform each identified print-related function associated with the identified cell;

selecting, from the first plurality, a second plurality of cell operators based on at least one relationship amongst the second plurality of cell operators by:

identifying a range of a number of cell operators needed to staff the cell, wherein the range is defined by a minimum number of cell operators needed to staff the cell and a maximum number of cell operators needed to staff the cell, for each number of cell operators in the range, determining a cohesiveness value associated with each distinct combination of cell operators in the subset equal to the number of cell operators, wherein determining the cohesiveness value comprises:

determining a total number of relationships that exist among the cell operators in the combination, identifying a total number of cell operators in the combination, determining a product of the total number of cell operators and one less than the total number of cell operators, and determining a ratio of the total number of relationships to the product, and selecting the combination having a highest cohesiveness value; and assigning the second plurality of cell operators from the selected combination to the identified cell.

16. The method of claim 15, wherein identifying a first plurality of cell operators comprises identifying a plurality of cell operators based on an availability status for each cell operator.

17. The method of claim 15, wherein one or more of the following relationships exist among or between the cell operators in the second plurality:
a social relationship;
a personal relationship; and
a professional relationship.

18. The method of claim 15, wherein a relationship that exists among the cell operators has an associated relationship strength.

* * * * *